US009854259B2

(12) United States Patent
Rapaka et al.

(10) Patent No.: US 9,854,259 B2
(45) Date of Patent: *Dec. 26, 2017

(54) SMOOTHING OF DIFFERENCE REFERENCE PICTURE

(71) Applicant: QUALCOMM Incorporated, San Diego, CA (US)

(72) Inventors: Krishnakanth Rapaka, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 578 days.

This patent is subject to a terminal disclaimer.

(21) Appl. No.: 13/935,283

(22) Filed: Jul. 3, 2013

(65) Prior Publication Data

US 2014/0010300 A1 Jan. 9, 2014

Related U.S. Application Data

(60) Provisional application No. 61/669,545, filed on Jul. 9, 2012, provisional application No. 61/706,739, filed
(Continued)

(51) Int. Cl.
*H04N 7/26* (2006.01)
*H04N 19/30* (2014.01)
(Continued)

(52) U.S. Cl.
CPC .......... *H04N 19/30* (2014.11); *H04N 19/105* (2014.11); *H04N 19/147* (2014.11); *H04N 19/33* (2014.11);
(Continued)

(58) Field of Classification Search
CPC .......... H04N 19/00424; H04N 19/105; H04N 19/147; H04N 19/30; H04N 19/33;
(Continued)

(56) References Cited

U.S. PATENT DOCUMENTS 5,973,739 A   10/1999   Nilsson
8,130,822 B2   3/2012   Segall
(Continued)

FOREIGN PATENT DOCUMENTS

CN   101690237 A   3/2010
EP   2164266 A1    3/2010
(Continued)

OTHER PUBLICATIONS

Hayase K. et al., "A Weighted Prediction of Spatial Scalable Video Coding with Inter-Layer Information", 26, Picture Coding Symposium; Nov. 7, 2011-Nov. 9, 2011; Lisbon, Nov. 7, 2007, XP030080373, 4 pages.
(Continued)

*Primary Examiner* — M D Haque

(57) ABSTRACT

An apparatus for coding video information according to certain aspects includes a memory unit and a processor in communication with the memory unit. The memory unit stores difference video information associated with a difference video layer of pixel information derived from a difference between an enhancement layer and a corresponding base layer of the video information. The processor determines a value of a video unit based on a reference video unit or spatial neighboring video unit within the difference video layer and applies a smoothing filter to the reference video unit or spatial neighboring video unit.

41 Claims, 12 Drawing Sheets

Related U.S. Application Data on Sep. 27, 2012, provisional application No. 61/706,741, filed on Sep. 27, 2012.

(51) Int. Cl.

| | | |
|---|---|---|
| *H04N 19/105* | (2014.01) | |
| *H04N 19/70* | (2014.01) | |
| *H04N 19/147* | (2014.01) | |
| *H04N 19/593* | (2014.01) | |
| *H04N 19/80* | (2014.01) | |
| *H04N 19/82* | (2014.01) | |
| *H04N 19/33* | (2014.01) | |
| *H04N 19/85* | (2014.01) | |
| *H04N 19/86* | (2014.01) | |

(52) U.S. Cl.
CPC ........... *H04N 19/593* (2014.11); *H04N 19/70* (2014.11); *H04N 19/80* (2014.11); *H04N 19/82* (2014.11); *H04N 19/85* (2014.11); *H04N 19/86* (2014.11)

(58) Field of Classification Search
CPC ...... H04N 19/593; H04N 19/70; H04N 19/80; H04N 19/82; H04N 19/85; H04N 19/86
See application file for complete search history.

(56) References Cited

U.S. PATENT DOCUMENTS

| | | | | |
|---|---|---|---|---|
| 2001/0056289 | A1* | 12/2001 | Sippensgroenewegen | ....... 607/5 |
| 2004/0030262 | A1* | 2/2004 | Fisher et al. | ................... 600/564 |
| 2006/0215762 | A1 | 9/2006 | Han et al. | |
| 2006/0280372 | A1 | 12/2006 | Han | |
| 2007/0014348 | A1 | 1/2007 | Bao et al. | |
| 2007/0171969 | A1 | 7/2007 | Han et al. | |
| 2007/0296865 | A1* | 12/2007 | Mino | .................... G09G 3/2007 348/571 |
| 2007/0299353 | A1* | 12/2007 | Harlev et al. | ................... 600/509 |
| 2008/0033286 | A1* | 2/2008 | Whitmore et al. | ........... 600/426 |
| 2008/0089417 | A1* | 4/2008 | Bao | ...................... H04N 19/176 375/240.16 |
| 2009/0097548 | A1 | 4/2009 | Karczewicz et al. | |
| 2009/0129474 | A1 | 5/2009 | Pandit et al. | |
| 2009/0175350 | A1* | 7/2009 | Jeong | ................... H04N 19/176 375/240.24 |
| 2009/0252229 | A1 | 10/2009 | Cieplinski | |
| 2009/0274214 | A1 | 11/2009 | Yoon et al. | |
| 2010/0020886 | A1 | 1/2010 | Raveendran et al. | |
| 2010/0158110 | A1* | 6/2010 | Pandit | ................... H04N 19/105 375/240.12 |
| 2010/0208809 | A1 | 8/2010 | Yin et al. | |
| 2011/0118723 | A1* | 5/2011 | Turner et al. | ................... 606/33 |
| 2011/0200171 | A1* | 8/2011 | Beetel et al. | ................... 378/65 |
| 2011/0238083 | A1* | 9/2011 | Moll et al. | .................... 606/130 |
| 2011/0293013 | A1* | 12/2011 | Ma | ....................... H04N 19/51 375/240.16 |
| 2012/0014440 | A1* | 1/2012 | Segall | .................... H04N 7/345 375/240.12 |
| 2013/0003833 | A1* | 1/2013 | Jang | ..................... H04N 19/105 375/240.12 |
| 2013/0116679 | A1* | 5/2013 | Van der Weide et al. | ...... 606/33 |
| 2013/0338477 | A1* | 12/2013 | Glossop et al. | ............. 600/407 |
| 2014/0010290 | A1 | 1/2014 | Rapaka et al. | |

FOREIGN PATENT DOCUMENTS

| | | |
|---|---|---|
| JP | H07162870 A | 6/1995 |
| JP | 2008535310 A | 8/2008 |
| JP | 2009512347 A | 3/2009 |
| JP | 5185266 B2 | 4/2013 |
| WO | WO-2006101354 A1 | 9/2006 |
| WO | WO-2007047271 A2 | 4/2007 |
| WO | WO-2008111005 A1 | 9/2008 |
| WO | WO-2009005071 A1 | 1/2009 |
| WO | 2011017823 A1 | 2/2011 |

OTHER PUBLICATIONS

Hong D. et al., "Scalability Support in HEVC," Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F290, pp. 1-15.
International Search Report and Written Opinion—PCT/US2013/049589—ISA/EPO—Nov. 4, 2013.
Segall C.A., et al., "Spatial Scalability Within the H.264/AVC Scalable Video Coding Extension", IEEE Transactions on Circuits and Systems for Video Technology, IEEE Service Center, Piscataway, NJ, US, vol. 17, No. 9, Sep. 1, 2007 (Sep. 1, 2007), pp. 1121-1135, XP011193020, ISSN: 1051-8215, DOI: 10.1109/TCSVT.2007.906824.
Chen J., et al., "Description of Scalable Video Coding Technology Proposal by Qualcomm (configuration 1)", Joint Collaborative Team on Video Coding (JCT-VC) of ITU-T SG16 WP3 and ISO/IEC JTC1/SC29/WG11, No. JCTVC-K0035, 11th Meeting: Shanghai, CN, Oct. 10-19, 2012, XP030112967, pp. 1-19.
Dong J., et al., "Description of Scalable Video Coding Technology Proposal by InterDigital Communications," Joint Collaborative Team on Video Coding (JCT-VC) of ITU-T SG16 WP3 and ISO/IEC JTC1/SC29/WG11, 11th Meeting: Shanghai, CN, Document: JCTVC-K0034_r1, Oct. 10-19, 2012, pp. 1-30.
Wien M, "High Efficiency Video Coding", Coding Tools and specification, Chapter 12, 2015, pp. 291-308.
Zhang L., et al., "CE4: Advanced Residual Prediction for Multiview Coding," Joint Collaborative Team on 3D Video Coding Extension of ITU-T SG.16 WP 3andISO/IEC JTC1/SC29/WG11, Document: JCT3V-D0177_proposed_text_r1, Apr. 20-26, 2013, 6 pp.
Zhang L., et al., "Proposed Text for JCT3V-F0123 Based on 3D-HEVC Draft Text 1," Joint Collaborative Team on 3D Video Coding Extensions of ITU-T SG 16 WP 3 and ISO/IEC JTC 1/SC 29/WG 11 6th Meeting: Geneva, CH, Document: JCT3V-F0123_proposed_text, Oct. 25-Nov. 1, 2013, 6 pages.

* cited by examiner

SMOOTHING OF DIFFERENCE REFERENCE PICTURE

RELATED APPLICATION

This application claims the benefit of U.S. Provisional Application No. 61/669,545, filed Jul. 9, 2012, U.S. Provisional Application No. 61/706,739, filed Sep. 27, 2012, and U.S. Provisional Application No. 61/706,741, filed Sep. 27, 2012, the entire contents of which are incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to scalable video coding (SVC). More specifically, the techniques of this disclosure relate to intra and inter prediction in difference domain coding. In some examples, the techniques may assign different weights to a reference frame from the enhancement layer and a reference frame from the reconstructed base layer in order to generate a reference frame for the difference domain. In some examples, the techniques may assign different weights to spatial neighboring pixels from the enhancement layer and spatial neighboring pixels from the reconstructed base layer in order to generate neighboring pixels for the difference domain for intra prediction. By assigning weight values to the EL and the reconstructed BL, the techniques may account for weak spatial and temporal correlation between frames in the same layer and/or weak correlation between the EL and the BL. For example, an EL and a BL may be very different in terms of the picture they present. In such case, the EL reference frame may be given more weight in generating the difference domain reference frame. Alternatively, the reconstructed BL reference may be given more weight instead of the EL reference frame.

In some examples, the techniques may also apply a smoothing filter or a low-pass filter to a reference frame in the difference domain for inter prediction or a smoothing filter or a low-pass filter to spatial neighboring pixels in the difference domain in order to reduce the high frequency noise likely to be present in the difference domain. The techniques may apply a simple smoothing filter, such as a 1:2:1 filter, in order to retain texture without adding computational complexity. Any smoothing filter can be applied as long as the benefits of applying the filter outweigh the additional computational complexity.

An apparatus for coding video information according to certain aspects includes a memory unit and a processor in communication with the memory unit. The memory unit stores difference video information associated with a difference video layer of pixel information derived from a difference between an enhancement layer and a corresponding base layer of the video information. The processor determines an enhancement layer weight and a base layer weight, and determines a value of a current video unit based on the difference video layer, a value of a video unit in the enhancement layer weighted by the enhancement layer weight, and a value of a video unit in the base layer weighted by the base layer weight.

An apparatus for coding video information according to certain aspects includes a memory unit and a processor in communication with the memory unit. The memory unit stores difference video information associated with a difference video layer of pixel information derived from a difference between an enhancement layer and a corresponding base layer of the video information. The processor determines a value of a video unit based on a reference video unit or spatial neighboring video unit within the difference video layer and applies a smoothing filter to the reference video unit or spatial neighboring video unit.

The details of one or more examples are set forth in the accompanying drawings and the description below. Other features, objects, and advantages will be apparent from the description and drawings, and from the claims.

DETAILED DESCRIPTION

Figure 1:
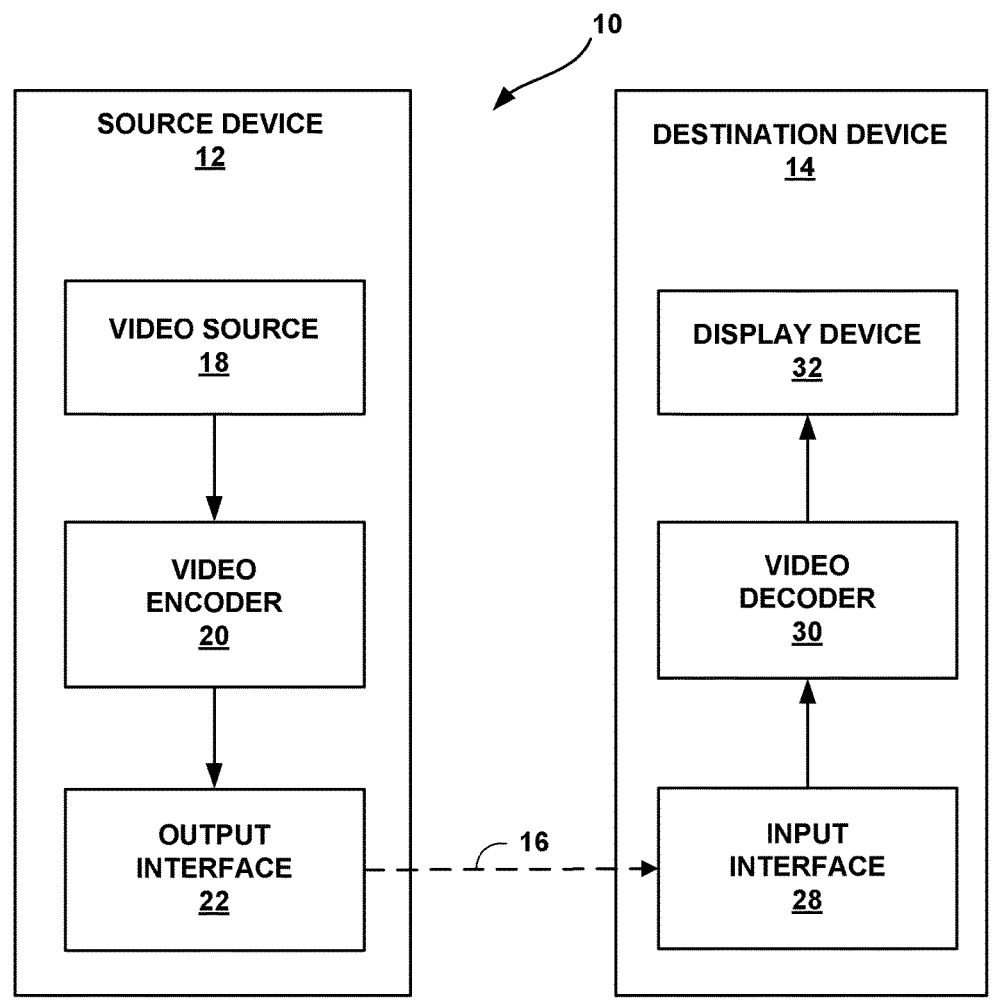
FIG. 1 is a block diagram illustrating an example video encoding and decoding system that may utilize techniques in accordance with aspects described in this disclosure.

The techniques described in this disclosure generally relate to scalable video coding (SVC). For example, the techniques may be related to, and used with or within, a High Efficiency Video Coding (HEVC) scalable video coding (SVC) extension. In an SVC extension, there could be multiple layers of video information. The layer at the very bottom level may serve as a base layer (BL), and the layer at the very top may serve as an enhanced layer (EL). The "enhanced layer" is sometimes referred to as an "enhancement layer," and these terms may be used interchangeably. All layers in the middle may serve as either or both ELs or BLs. For example, a layer in the middle may be an EL for the layers below it, such as the base layer or any intervening enhancement layers, and at the same time serve as a BL for the enhancement layers above it.

For purposes of illustration only, the techniques described in the disclosure are described with examples including only two layers (e.g., lower level layer such as the base layer, and a higher level layer such as the enhanced layer). It should be understood that the examples described in this disclosure can be extended to examples with multiple base layers and enhancement layers as well.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://wg11.sc29.org/jct/doc_end_user/current_document.php?id=5885/JCTVC-I1003-v2, as of Jun. 7, 2012. Another recent draft of the HEVC standard, referred to as "HEVC Working Draft 7" is downloadable from http://phenix.it-sudparis.eu/jct/doc_end_user/documents/9_Geneva/wg11/JCTVC-I1003-v3.zip, as of Jun. 7, 2012. The full citation for the HEVC Working Draft 7 is document HCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9$^{th}$ Meeting: Geneva, Switzerland, Apr. 27, 2012 to May 7, 2012. Each of these references is incorporated by reference in its entirety.

Scalable video coding (SVC) may be used to provide quality (also referred to as signal-to-noise (SNR)) scaling, spatial scaling and/or temporal scaling. An enhanced layer may have different spatial resolution than base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In coding an enhancement layer, inter prediction may be performed using either pixel domain or difference domain. Inter prediction is prediction based on temporal correlation between video blocks in two frames or slices in sequence of time. For example, the value of a current video block being coded may be predicted using a motion vector that indicates a displacement from the reference video block in a previously coded frame or slice. In SVC, video information can be coded using a base layer and one or more enhancement layers, and inter prediction can be performed in the difference domain, e.g., by taking the difference between the enhancement layer and the reconstructed base layer. The difference domain may refer to a set of difference pixels formed by subtracting the reconstructed base layer pixels from the reconstructed pixels in the enhancement layer, or vice versa. Inter prediction in the difference domain can take advantage of the temporal correlation between frames as well as the correlation between a base layer and an enhancement layer. Similarly, intra prediction can take advantage of the spatial correlation between frames as well as the correlation between a base layer and an enhancement layer.

However, the difference pixels in the difference domain are generally high frequency components, for example, due to loss from quantization when reconstructing the base layer. Therefore, inter prediction using reference frames and intra prediction using spatial neighboring pixels in the difference domain may not lead to good prediction results. In addition, the spatial and temporal correlation of the current prediction unit may be stronger either in the enhancement layer or the reconstructed base layer, or vice versa. Accordingly, it would be advantageous to generate temporal reference frames and spatial neighboring pixels in the difference domain by weighting the enhancement layer and the reconstructed base layer according to the characteristics of the enhancement layer and the reconstructed base layer.

In addition, as explained above, the difference domain is likely to contain high frequency components, which are not great for intra or inter prediction. For example, such high frequency components may result from weak spatial and temporal correlation between frames. High frequency components may also result from large quantization loss when enhancement layer and the reconstructed base layer are operating at different quantization or they are of different spatial resolutions. For example, the enhancement layer and the base layer may be operating at a different quantization parameter, which can lead to the difference between the enhancement layer and the reconstructed base layer to be high frequency. Accordingly, it would be advantageous to reduce the high frequency noise of the difference domain pixels.

The techniques described in this disclosure may address issues relating to intra and inter prediction in the difference domain. The techniques may assign different weights to a reference frame and spatial neighboring pixels from the enhancement layer and a reference frame and spatial neighboring pixels from the reconstructed base layer in order to generate a reference frame and spatial neighboring pixels for the difference domain. By assigning weight values to the EL and the reconstructed BL, the techniques may account for weak temporal correlation between frames in the same layer and/or weak correlation between the EL and the BL. For example, an EL might be better quality than base layer. In such case, the EL reference frame may be given more weight in generating the difference domain reference frame. Alternatively, the reconstructed BL reference may be given more weight instead of the EL reference frame.

The techniques may also apply a smoothing filter to a reference frame or spatial neighboring pixels in the difference domain in order to reduce the high frequency noise likely to be present in the difference domain. The techniques may apply a simple smoothing filter, such as a 1:2:1 filter, in order to retain texture without adding computational complexity. Any smoothing filter can be applied as long as the benefits of applying the filter outweigh the additional computational complexity.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a block diagram illustrating an example video encoding and decoding system that may utilize techniques in accordance with aspects described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding a bitstream including video data conforming to multiple standards or standard extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining candidates for a candidate list for motion vector predictors for a current block may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission, direct wired communication, etc. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard, including but not limited to any of the standards listed above. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Figure 2:
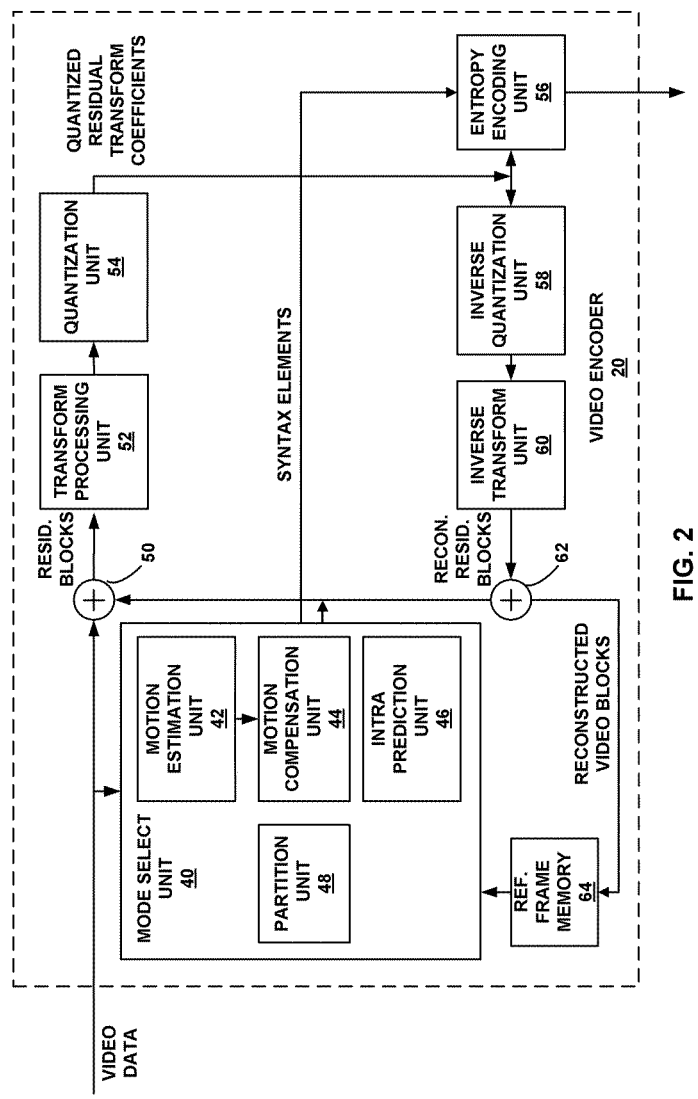
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure. As one example, mode select unit 40 may be configured to perform any or all of the techniques described in this disclosure. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

In some embodiments, the mode select unit 40, the motion estimation unit 42, the motion compensation unit 44, the intra prediction unit 46 (or another component of the mode select unit 40, shown or not shown), or another component of the encoder 20 (shown or not shown) may perform the techniques of this disclosure. For example, the mode select unit 40 may receive video data for encoding, which may be encoded into a base layer and corresponding one or more enhancement layers. The mode select unit 40, the motion estimation unit 42, the motion compensation unit 44, the intra prediction unit 46, or another appropriate unit of the encoder 20 may determine an enhancement layer weight and a base layer weight. The appropriate unit of the encoder 20 may also determine a value of a current video unit based on a difference video layer, a value of a video unit in the enhancement layer weighted by the enhancement layer weight, and a value of a video unit in the base layer weighted by the base layer weight. The encoder 20 can encode the current video unit and signal the enhancement layer weight and the base layer weight in a bitstream.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 1, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
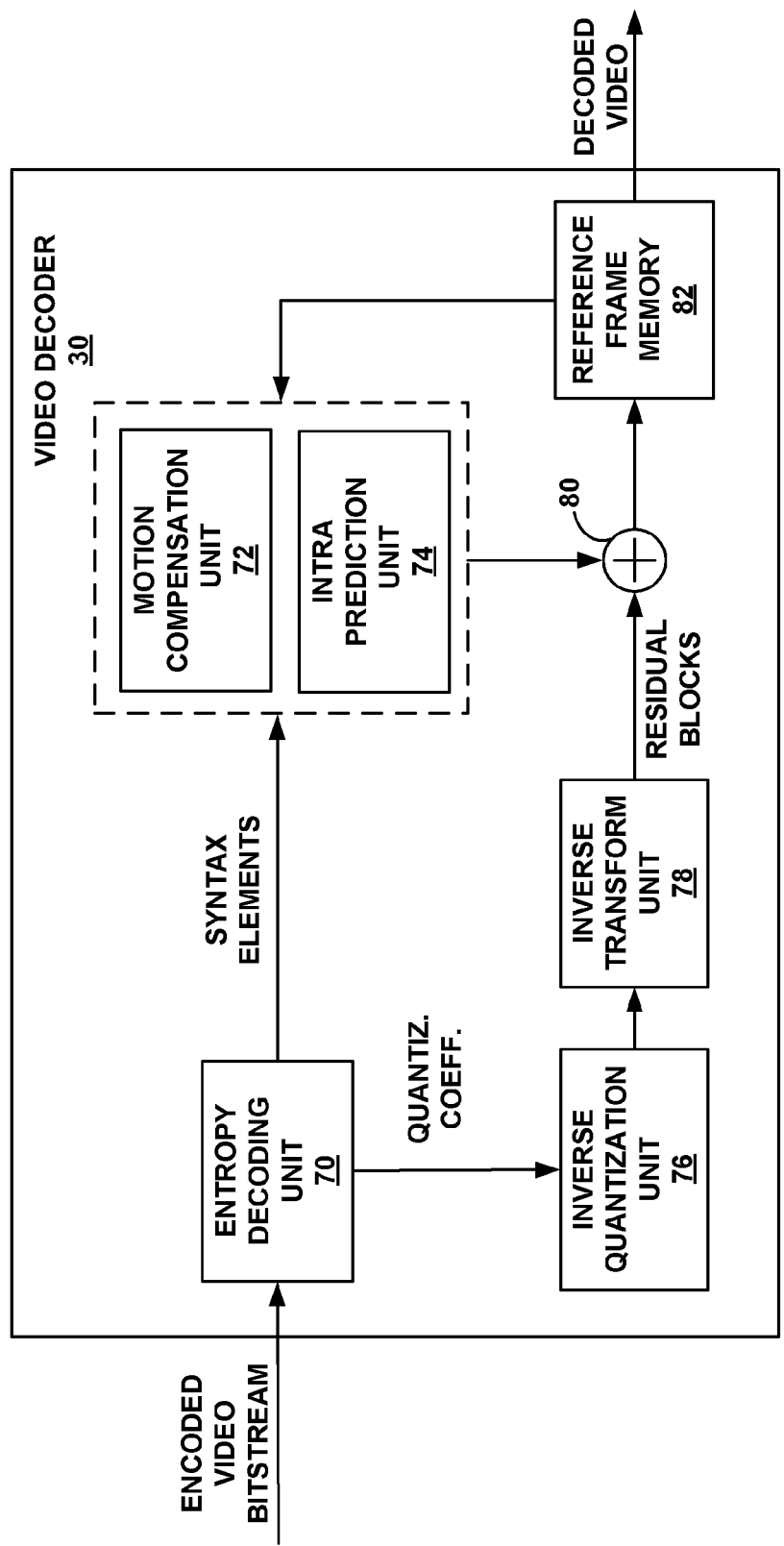
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure. As one example, motion compensation unit 72 and/or intra prediction unit 74 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In some embodiments, the entropy decoding unit 70, the motion compensation unit 72, the intra prediction unit 74, or another component of the decoder 30 (shown or not shown) may perform the techniques of this disclosure. For example, the entropy decoding unit 70 may receive an encoded video bitstream, which may encode data relating to a base layer and corresponding one or more enhancement layers. The motion compensation unit 72, the intra prediction unit 74, or another appropriate unit of the decoder 30 may determine an enhancement layer weight and a base layer weight. The appropriate unit of the decoder 30 may also determine a value of a current video unit based on a difference video layer, a value of a video unit in the enhancement layer weighted by the enhancement layer weight, and a value of a video unit in the base layer weighted by the base layer weight. The decoder 30 can decode the current video unit and receive the enhancement layer weight and the base layer weight in a bitstream. The decoder 30 may also at least partially derive the enhancement layer weight and the base layer weight from information in a bitstream.

In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, e.g., de-quantizes, the quantized transform coefficients provided in the bitstream and decoded by entropy decoding unit 80. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

Figure 4:
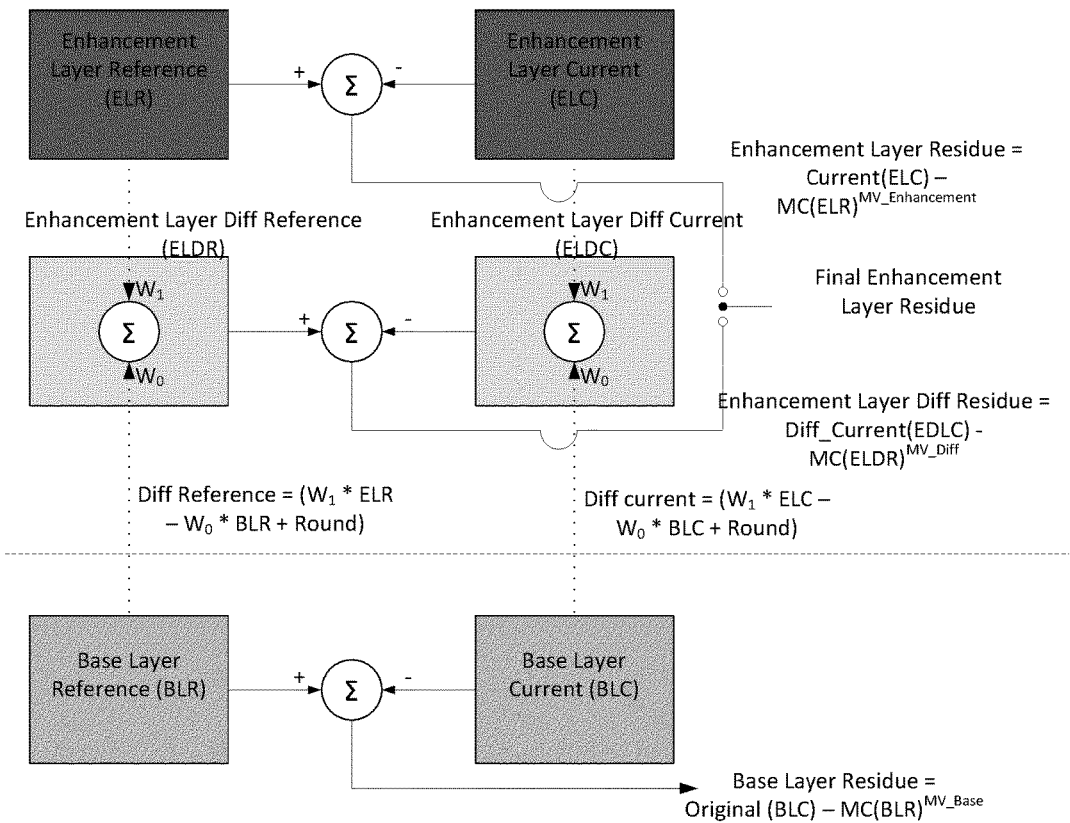
FIG. 4 is a conceptual diagram illustrating adaptive weighted difference domain reference reconstruction according to aspects of this disclosure.
Figure 4A:
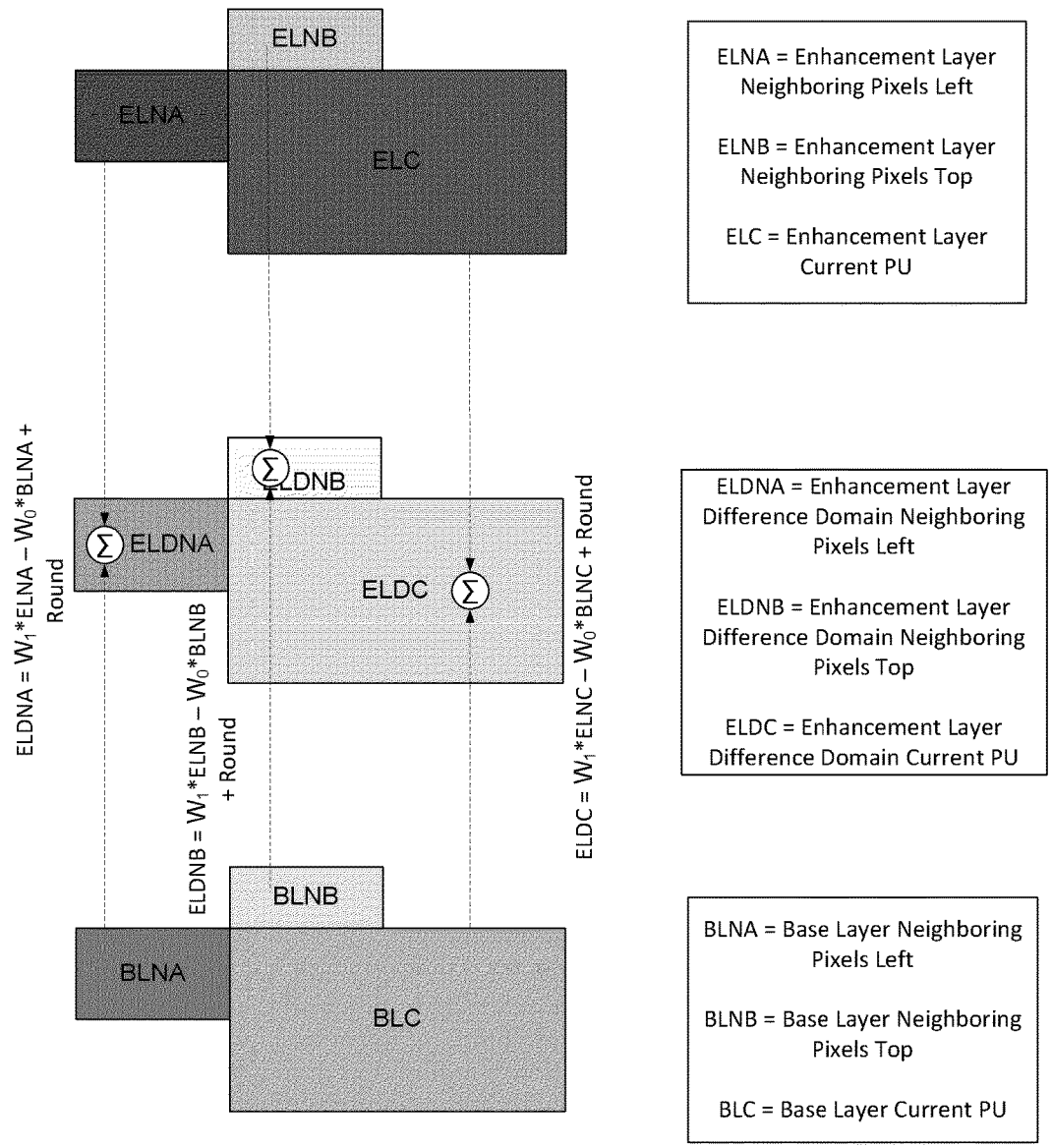
FIG. 4A is a conceptual diagram illustrating adaptive weighted difference domain reference reconstruction according to aspects of this disclosure.

FIG. 4 and FIG. 4A are conceptual diagrams illustrating adaptive weighted difference domain reference reconstruction according to aspects of this disclosure. As explained above, the difference domain may include many high frequency components. The high frequency nature of the difference domain may be due the enhancement layer (EL) and the base layer (BL) operating at different quantization or spatial resolution. In such case, taking the difference between the EL and the reconstructed BL frames to obtain difference domain frames will result in high frequency components, and coding of such high frequency components may not result in good rate-distortion trade-off. Also, the EL and reconstructed BL frame might be operating at different spatial resolutions, in which case reconstructed BL is upsampled to match the resolution of EL. This operation could reduce the correlation between them and lead to high frequency difference domain components, which are difficult to code.

Accordingly, the techniques of this disclosure may assign a weighted value to a reference frame in the EL and a reference frame in the reconstructed BL in order to generate a reference frame for the difference domain. Similarly, the techniques of this disclosure may assign a weighted value to spatial neighboring pixels in the EL and spatial neighboring pixels in the reconstructed BL in order to generate spatial neighboring pixels for the difference domain. The actual weighted value may be based on a number of different factors. Such factors may include similarity of the EL and the BL. Another factor can be whether a layer has strong temporal correlation. If the EL has stronger temporal correlation than the reconstructed BL, more weight may be given to the EL reference frame. A first weight value may be assigned to the EL reference frame, and a second value may be assigned to the reconstructed BL reference frame. The first weight value for the EL may be referred to as the "EL weight," and the second weight value for the reconstructed BL layer may be referred to as the "BL weight." In FIG. 4, the EL weight is indicated by $W_1$, and the BL weight is indicated by $W_0$.

The EL and BL weight values have been explained in terms of reference frames above. However, the EL and BL weight values may also be assigned to the current frames. Therefore, the EL frame and the corresponding reconstructed BL frame at a given point in time can each have an EL weight and a BL weight. For example, frames at time $T_1$ and time $T_2$ are used for inter prediction. The EL and the reconstructed BL at $T_1$ will have corresponding $W_1$ and $W_0$ values, and the EL and the reconstructed BL at $T_2$ will also have corresponding $W_1$ and $W_0$ values, which may be different from W1 and $W_0$ at $T_1$. The difference reconstruction frame (or difference domain frame) for each point in time may be generated by taking the difference between the EL weighted by $W_1$ and the reconstructed BL weighted by $W_0$. Inter prediction in the difference domain is performed by taking the difference reconstruction frame at $T_1$ and the difference reconstruction frame at $T_2$ and predicting them from each other to generate the difference domain residue. Accordingly, weighting the EL and the reconstructed BL can have an effect on inter prediction in the difference domain. The difference spatial neighboring pixels for intra prediction (or difference domain spatial neighboring pixels) for each point in time may be generated by taking the difference between the EL weighted by $W_1$ and the reconstructed BL weighted by $W_0$. Intra prediction in the difference domain is performed by taking the current difference reconstruction prediction unit at $T_1$ and the difference reconstruction spatial neighboring pixels at $T_1$ and predicting them from each other to generate the difference domain residue. Accordingly, weighting the EL and the reconstructed BL can have an effect on intra prediction in the difference domain.

Adaptive weighted difference domain reference reconstruction according to the techniques of this disclosure will now be explained in more detail with reference to FIG. 4 and FIG. 4A. In some embodiments, the adaptive weighted difference domain reconstruction may be calculated according to the following equation:

Diff Recon=($W_1$*EL Recon–$W_0$*BL Recon)  (1)

In Equation (1), Diff Recon refers to the difference domain reconstruction, EL Recon refers to the enhancement layer reconstruction, and BL Recon refers to the base layer reconstruction. In some embodiments, a Round value could be added while calculating the weighted difference domain reconstruction according to the following equation:

Diff Recon=($W_1$*EL Recon–$W_0$*BL Recon+Round)  (2)

The Round value may either be coded or assumed to be a default value at different syntax levels supported in HEVC. For example, rounding values can be supported in sequence header, picture header, slice header, LCU header, and CU level syntax. In some embodiments, finer rounding values can be chosen by rate-distortion (R-D) optimization criteria at different granular syntax levels.

In the example of FIG. 4, Equation (2) is applied to EL and reconstructed BL frames at different points in time (e.g., $T_1$ and $T_2$) to adaptively assign weight to the frames from the layers. At $T_1$, the Enhancement Layer Reference (ELR) and the reconstructed Base Layer Reference (BLR) are weighted by $W_1$ and $W_0$, respectively, in order to generate the Enhancement Layer Difference Reference (ELDR). The ELDR refers to the difference reconstruction frame. The ELDR may be calculated according to Equation (2) as follows:

ELDR=($W_1$*ELR–$W_0$*BLR+Round)

Similarly, at $T_2$, the Enhancement Layer Current (ELC) and the reconstructed Base Layer Current (BLC) are weighted by $W_1$ and $W_0$, respectively, in order to generate the Enhancement Layer Difference Current (ELDC). The ELDC refers to the difference reconstruction frame. The ELDC may be calculated according to Equation (2) as follows:

ELDC=($W_1$*ELC–$W_0$*BLC+Round)

Inter prediction may be performed using the Enhancement Layer Difference Reference (ELDR) and the Enhancement Layer Difference Current (ELDC) in order to generate the Enhancement Layer Difference Residue (ELDR). The ELDR may be calculated as follows:

Enhancement Layer Diff Residue=Diff Current (ELDC)–$MC$(ELDR)$^{MV\ Difference\_domain}$  (3)

The above expression denotes the difference between the ELDC and the ELDR obtained through motion compensation based on the motion vector in the difference domain, which may be referred as the Enhancement Layer Difference Residue. In some examples, for encoder simplification purposes, the encoder may choose to use the motion vector of non-difference domain or pixel domain, instead of motion vector of the difference domain. Then, the above expression becomes:

Enhancement Layer Diff Residue=Diff Current (ELDC)–$MC$(ELDR)$^{MV\ Pixel\_domain}$ This may be a non-normative operation and up to the encoder to choose to do motion estimation on difference domain to get the motion vector of difference domain or choose to do motion estimation on pixel domain to get the motion vector of pixel domain. In some examples, as shown in FIG. 4A, intra prediction may also be performed using the Enhancement Layer Difference Neighboring pixels (ELDNA and ELDNB) and the Enhancement Layer Difference Current PU (ELDC) in order to generate the Enhancement Layer Difference Residue (ELDR). The ELDR may be calculated as follows:

Enhancement Layer Diff Residue=Diff Current (ELDC)–IntraMode(ELDN)  (4)

The above expression denotes the difference between the ELDC and the ELDN obtained based on the Intra Mode, which may be referred as the Enhancement Layer Difference Residue.

In adaptive weighted difference domain reconstruction, the EL weight and the BL weight may be any combination of numbers. Some examples are provided below for illustration purposes. When $W_1$ and $W_0$ are both equal to 1, the adaptive difference domain reconstruction is the same as the traditional difference domain reconstruction, in which the entire reconstructed BL frame is subtracted from the EL frame. Therefore, the traditional difference domain reconstruction may be expressed as Diff Recon=(EL Recon–BL Recon). Table 1 provides some example combinations of $W_1$ and $W_0$ and the corresponding form of Equation (1).

TABLE 1

| $W_0$ (BL weight) | $W_1$ (EL weight) | Difference Reconstruction Equation | Reconstructed Base Layer Weight |
|---|---|---|---|
| 1 | 1 | Diff Recon = (EL Recon – BL Recon) | 100% |
| 1 | 0.25 | Diff Recon = (EL Recon – 0.25 * BL Recon) | 25% |
| 1 | 0.5 | Diff Recon = (EL Recon – 0.5 * BL Recon) | 50% |
| 1 | 0.75 | Diff Recon = (EL Recon – 0.75 BL Recon) | 75% |

When $W_0$=1 and $W_1$=0.25, the reconstructed BL frame is weighted by 25% and subtracted from the EL Enhancement layer frame to form the difference domain frame. Equation (1) reduces to Diff Recon=(EL Recon–0.25*BL Recon) as shown in Table 1. When $W_0$=1 and $W_1$=0.5, the reconstructed BL frame is weighted by 50%, and Equation (1) reduces to Diff Recon=(EL Recon–0.5*BL Recon). When $W_0$=1 and $W_1$=0.25, the reconstructed BL frame is weighted by 75%, and Equation (1) reduces to Diff Recon=(EL Recon–0.75*BL Recon). In some embodiments, $W_1$ is greater than $W_0$ and $W_1$ is a power of 2 when using Equation (1). As explained above, a Round factor could be added.

The EL and BL weights may be coded at different syntax levels. For example, in HEVC, adaptive weight values can be supported in sequence header, picture header, slice header, and LCU header, and CU level syntax. In some embodiments, finer adaptive weights can be chosen by rate-distortion (R-D) optimization criteria at different granular syntax levels.

In some embodiments, the EL and the BL weights can be signaled using a flag (e.g., "weighted_difference_domain_recon_flag") that indicates that adaptive weight for the EL and the reconstructed BL layers are used. The flag can be added at the following syntax levels: sequence header, picture header, slice header, and LCU header, and CU. The EL and the BL weights may be initialized to 1. In one embodiment, a delta offset for $W_0$ and $W_1$ is signaled. In another embodiment, $W_0$ and $W_1$ values may be predefined, and an index indicating a particular set of predefined $W_0$ and $W_1$ values is signaled.

Although FIG. 4 and FIG. 4A have been explained mostly in terms of frames, the techniques according to aspects of this disclosure may be implemented at various levels of video information unit. For example, the techniques according to aspects of this disclosure described with respect to FIG. 4 and FIG. 4A may be implemented at frame, slice, block, and pixel level. In addition, all embodiments described with respect to FIG. 4 and FIG. 4A may be implemented separately, or in combination with one another.

Figure 5:
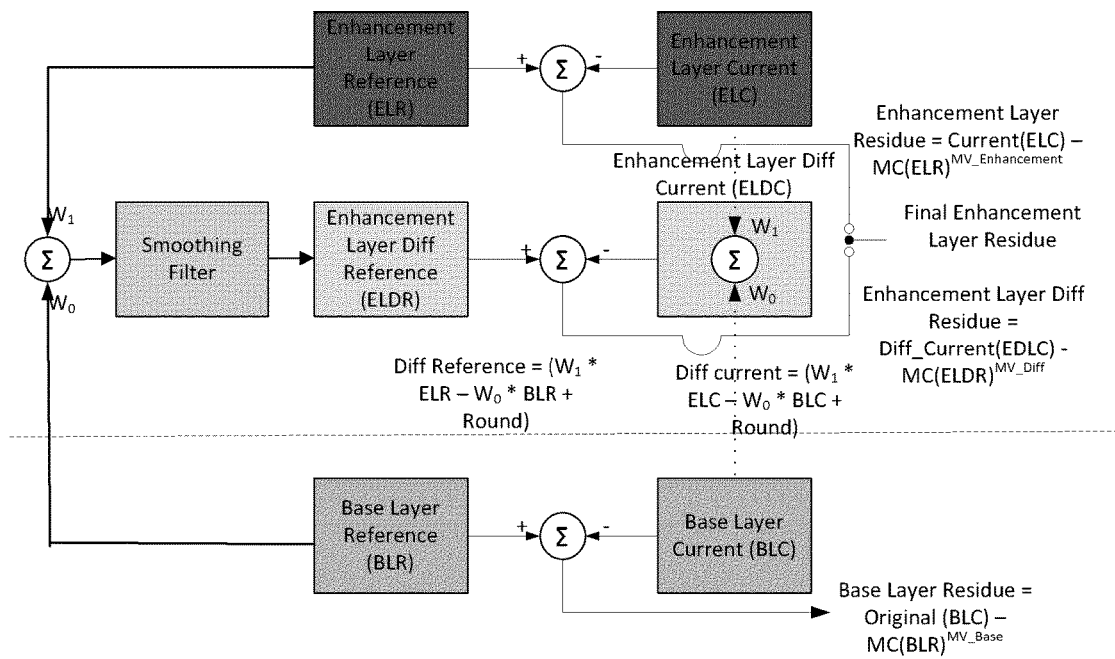
FIG. 5 is a conceptual diagram illustrating smoothing of difference domain reference according to aspects of this disclosure.
Figure 5A:
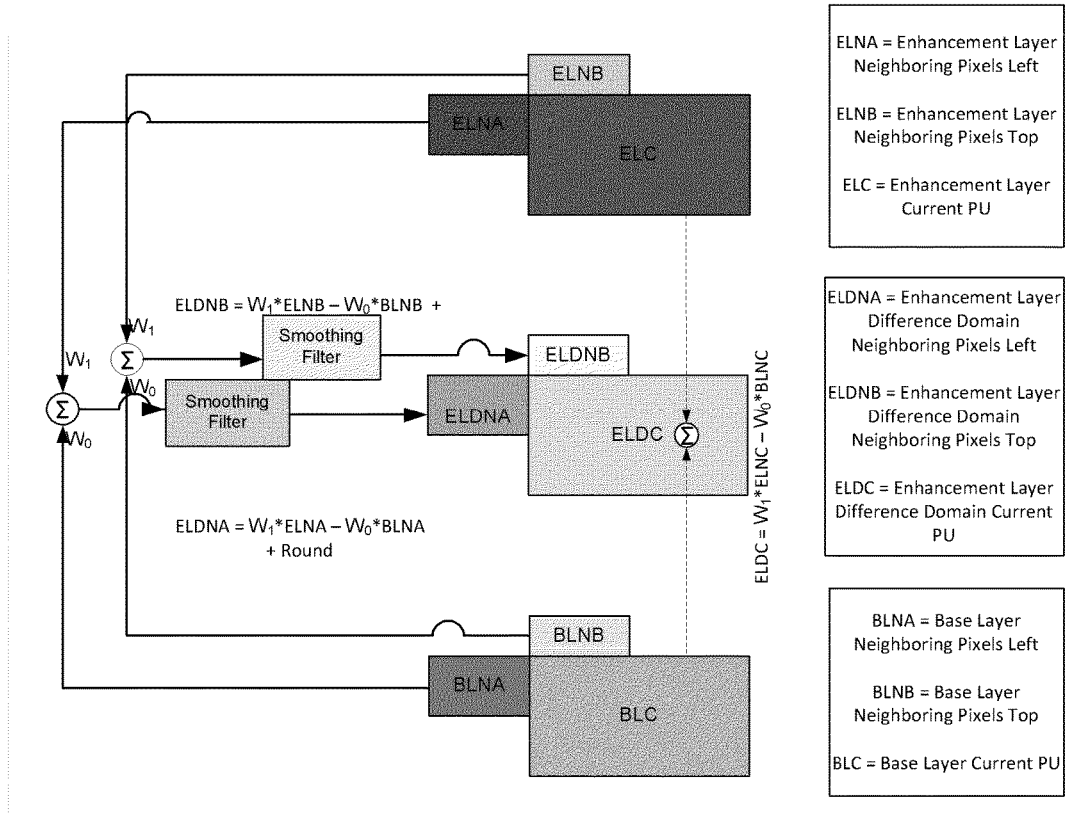
FIG. 5A is a conceptual diagram illustrating smoothing of difference domain reference according to aspects of this disclosure.

FIG. 5 and FIG. 5A are conceptual diagrams illustrating smoothing of difference domain reference according to aspects of this disclosure. Because the difference domain is likely to contain high frequency components, inter or intra prediction may not lead good prediction results when temporal reference frames or spatial neighboring reference pixels calculated using frames that have weak temporal/spatial correlation or weak correlation between the EL and the reconstructed BL. Therefore, the techniques may apply a smoothing filter or a low-pass filter to a reference frame in the difference domain in order to reduce the high frequency noise likely to be present in the difference domain. The techniques may apply a simple smoothing filter in order to retain texture without adding computational complexity. One example of a smoothing filter is a 1:2:1 filter, but any smoothing filter can be applied. The selection of the smoothing filter may depend on whether the reduction of high frequency noise provides more benefit than the cost from the additional computational complexity.

In some embodiments, the use of smoothed difference domain prediction may be indicated using a flag (e.g., "smoothed_difference_domain_prediction_flag"). In one embodiment, a new prediction mode may be defined for smoothed difference domain prediction (e.g., "smoothed difference domain prediction mode"), and the flag may indicate that this new prediction mode is used. In certain embodiments, the new prediction mode can be adaptively chosen based on rate-distortion (R-D) optimization criteria. The flag can be added at the following syntax levels: sequence header, picture header, slice header, and LCU header, and CU. All embodiments described with respect to FIG. 5 may be implemented separately, or in combination with one another.

FIG. 5A is similar to FIG. 5, but FIG. 5A illustrates smoothing in the context of intra prediction using difference domain spatial neighbors, instead of inter prediction using difference domain references.

Although FIG. 5 has been explained mostly in terms of frames, the techniques according to aspects of this disclosure may be implemented at various levels of video information unit. For example, the techniques according to aspects of this disclosure described with respect to FIG. 5 may be implemented at frame, slice, block, and pixel level. In addition, all embodiments described with respect to FIG. 5 and FIG. 5A may be implemented separately, or in combination with one another.

Figure 6:
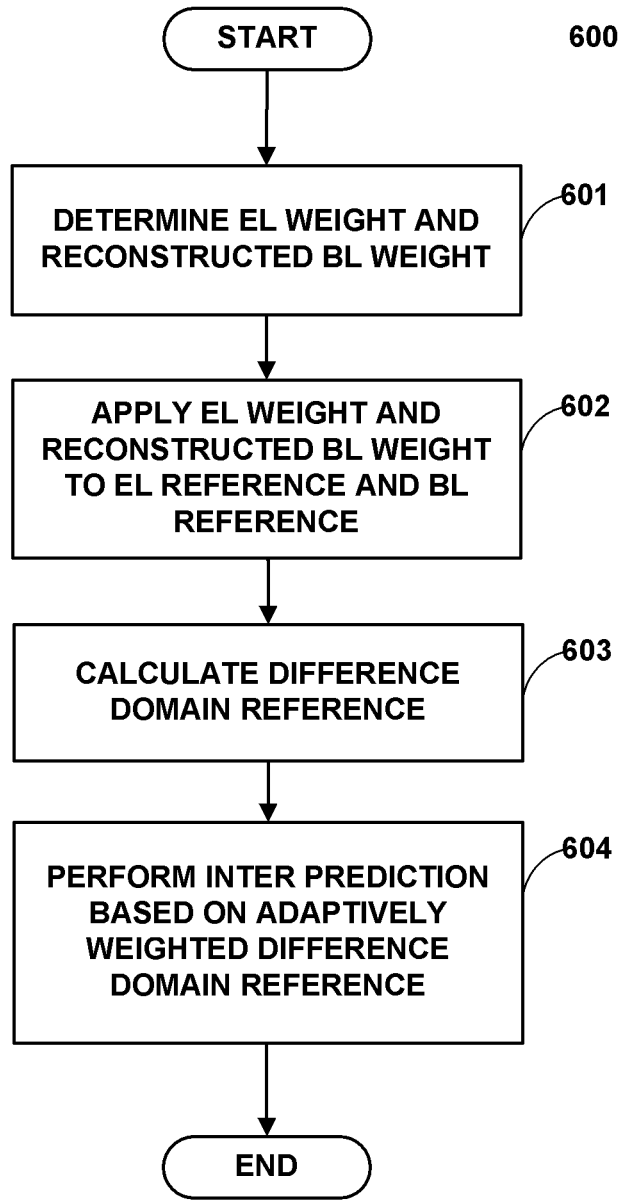
FIG. 6 is a flowchart illustrating an example method for adaptively generating difference domain references according to aspects of this disclosure.
Figure 6A:
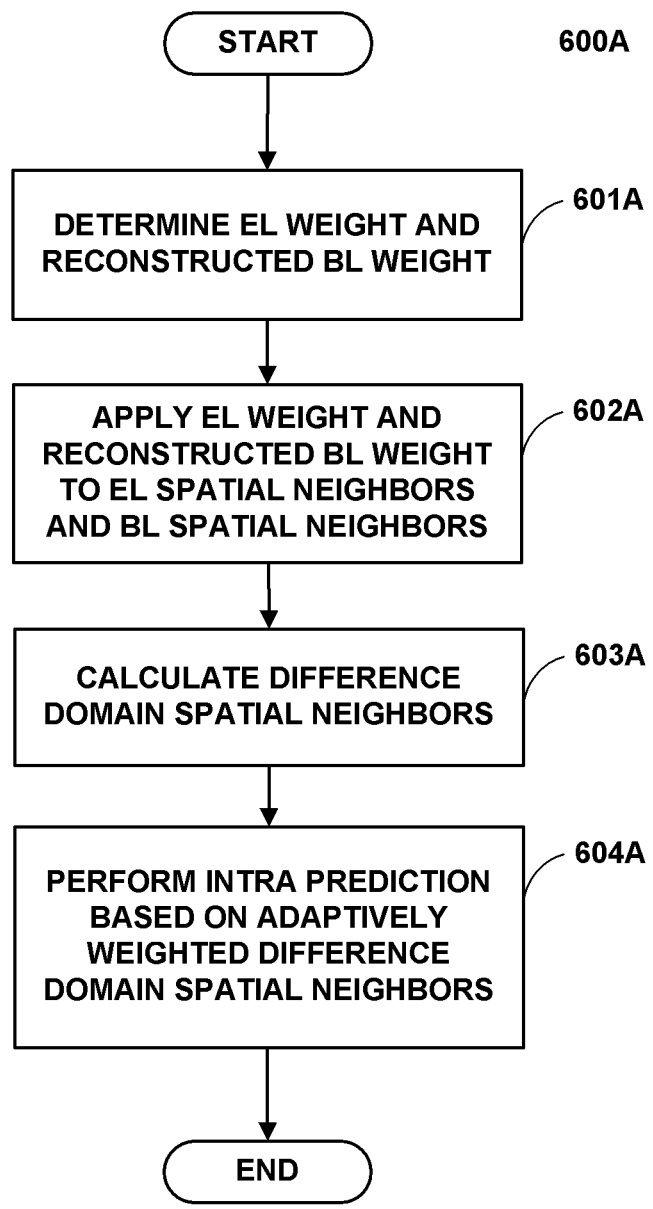
FIG. 6A is a flowchart illustrating an example method for adaptively generating difference domain references according to aspects of this disclosure.

FIGS. 6 and 6A are flowcharts illustrating an example method for adaptively generating difference domain references according to aspects of this disclosure. The process 600 may be performed by an encoder (e.g., the encoder as shown in FIG. 2, etc.) or a decoder (e.g., the decoder as shown in FIG. 3, etc.). The blocks of the process 600 are described with respect to the encoder 20 in FIG. 2, but the process 600 may be performed by other components, such as a decoder, as mentioned above. Similarly, the process 600A may be performed by an encoder or a decoder. The blocks of the process 600A are described with respect to the encoder 20 in FIG. 2, but the process 600A may be performed by other components, such as a decoder, as mentioned above.

At block 601, the encoder 20 determines EL weight and reconstructed BL weight. The EL weight and the BL weight may be based on a number of different factors. One such factor may be the similarity between the EL and the reconstructed BL. Another example of a relevant factor may be the temporal correlation in the EL. The temporal correlation in the reconstructed BL may also be a relevant factor. In some embodiments, the EL weight may be greater than the BL weight. In other embodiments, the BL weight may be greater than the EL weight. The EL weight and the BL weight may be assigned at various syntax levels supported by the coding standard (e.g., HEVC).

At block 602, the encoder 20 applies the determined EL weight and BL weight to the EL reference and the reconstructed BL reference. At block 603, the encoder 20 calculates the difference domain reference by subtracting the weighted reconstructed BL reference from the weighted EL reference. At block 604, the encoder 20 performs inter prediction based on the adaptively weighted difference domain references at different points in time. The example method described with respect to FIG. 6 may be implemented at various syntax levels.

The process 600A in FIG. 6A is similar to the process 600 in FIG. 6, but the process 600A performs intra prediction using difference domain spatial neighbors, instead of inter prediction using difference domain references. For example, at block 604A, the encoder 20 performs intra prediction adaptively weighted difference domain spatial neighbors at same points in time.

Figure 6B:
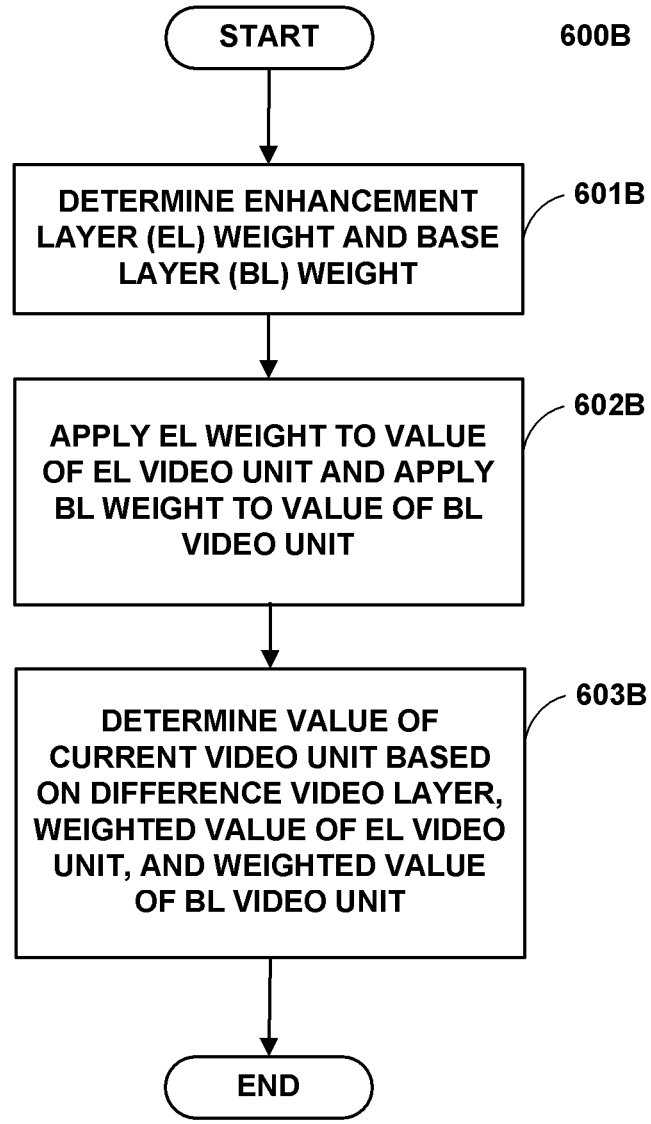
FIG. 6B is a flowchart illustrating another example method for adaptively generating difference domain references according to aspects of this disclosure.

FIG. 6B is a flowchart illustrating another example method for adaptively generating difference domain references according to aspects of this disclosure. The process 600B may be performed by an encoder (e.g., the encoder as shown in FIG. 2, etc.) or a decoder (e.g., the decoder as shown in FIG. 3, etc.). The blocks of the process 600B are described with respect to the encoder 20 in FIG. 2, but the process 600B may be performed by other components, such as a decoder, as mentioned above. All embodiments described with respect to FIG. 6B may be implemented separately, or in combination with one another.

At block 601B, the encoder 20 determines an enhancement layer weight and a base layer weight. In some embodiments, the video units from the enhancement layer and the base layer may be weighted differently, e.g., in order to obtain better prediction results or rate-distortion trade-off. In one embodiment, the enhancement layer weight and the base layer weight may be determined based upon a similarity between the enhancement layer and the base layer. For example, the base layer weight may be reduced compared to the enhancement layer weight if the two layers are not similar. Similarity may be based on, e.g., temporal correlation or spatial correlation between the enhancement layer and the base layer. The enhancement layer weight is applied to video units in the enhancement layer, and the base layer weight is applied to video units in the base layer.

At block 602B, the encoder 20 applies the enhancement layer weight to a value of a video unit in the enhancement layer, and applies the base layer weight to a value of a video unit in the base layer. The video unit in the enhancement layer and the video unit in the base layer may be reference video units from each layer, respectively. The enhancement layer weight and the base layer weight may be applied at any coding level, including, but not limited to the following syntax levels: a frame, a slice, a largest coding unit (LCU), a coding unit (CU), a block, a pixel, and a sub-pixel. The enhancement layer weight and the base layer weight may be signaled in a bitstream, or may be received in a bitstream or at least partially derived from information in a bitstream.

At block 603B, the encoder 20 determines a value of a current video unit based on the difference video layer, the value of the video unit in the enhancement layer weighted by the enhancement layer weight, and the value of the video unit in the base layer weighted by the base layer weight. Difference video layer may refer to the difference domain. A video unit may be any unit of video data, and can include but is not limited to: a frame, a slice, a largest coding unit (LCU), a coding unit (CU), a block, a pixel, and a sub-pixel. The value of the current video unit may be determined by generating a prediction unit (PU) for the current video unit. In some embodiments, the current video unit is a difference video unit associated with the difference video layer. The value of the current video unit may be determined based on a difference reference video unit or a difference spatial neighboring video unit associated with the difference video layer. The difference reference video unit or the difference spatial neighboring video unit may be derived from a difference of the weighted enhancement layer video unit and the weighted base layer video unit.

Figure 7:
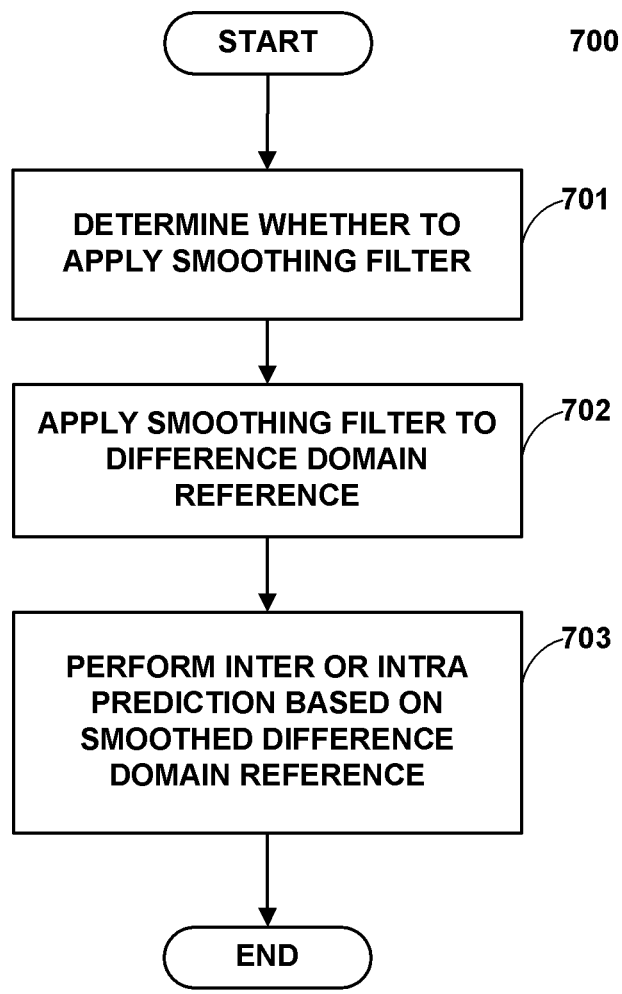
FIG. 7 is a flowchart illustrating an example method for smoothing difference domain references according to aspects of this disclosure.

FIG. 7 is a flowchart illustrating an example method for smoothing difference domain references according to aspects of this disclosure. The process 700 may be performed by an encoder (e.g., the encoder as shown in FIG. 2, etc.) or a decoder (e.g., the decoder as shown in FIG. 3, etc.). The blocks of the process 700 are described with respect to the encoder 20 in FIG. 2, but the process 700 may be performed by other components, such as a decoder, as mentioned above.

At block 701, the encoder 20 determines whether to apply a smoothing filter to a difference domain reference or spatial neighboring pixels. For example, the encoder 20 may decide that a difference domain reference or spatial neighboring pixels includes high frequency components. The encoder 20 may also choose to apply a smoothing filter as the default. The encoder 20 may also determine whether to apply a smoothing filter based on the computational complexity required by the application of the smoothing filter. At block 702, the encoder 20 applies a smoothing filter to the difference domain reference. At block 703, the encoder 20 performs inter prediction or intra prediction based on the smoothed difference domain reference or neighboring pixels, respectively. The example method described with respect to FIG. 7 may be implemented at various syntax levels.

Figure 7A:
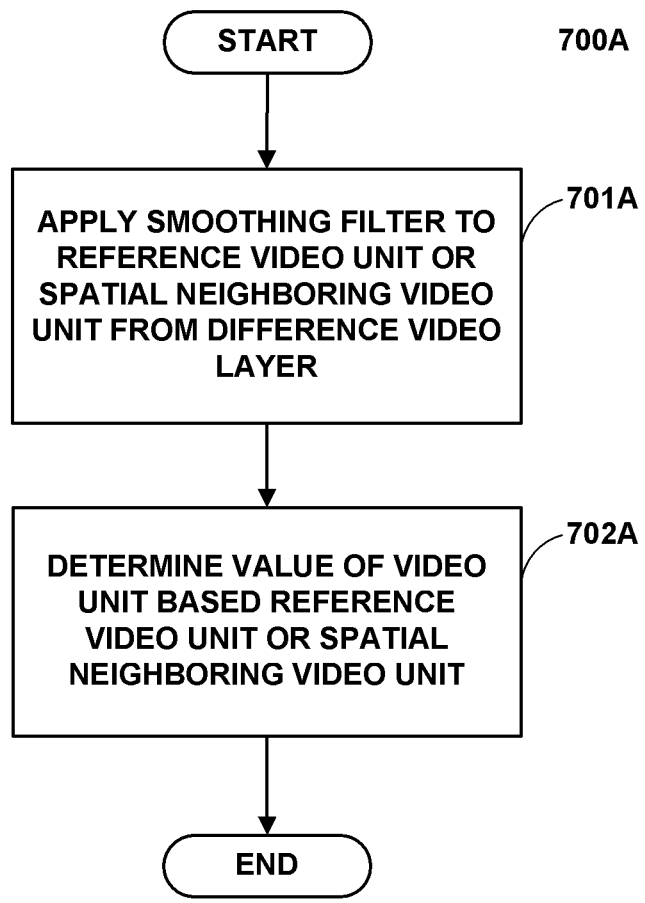
FIG. 7A is a flowchart illustrating another example method for smoothing difference domain references according to aspects of this disclosure.

FIG. 7A is a flowchart illustrating another example method for smoothing difference domain references according to aspects of this disclosure. The process 700A may be performed by an encoder (e.g., the encoder as shown in FIG. 2, etc.) or a decoder (e.g., the decoder as shown in FIG. 3, etc.). The blocks of the process 700A are described with respect to the encoder 20 in FIG. 2, but the process 700A may be performed by other components, such as a decoder, as mentioned above. All embodiments described with respect to FIG. 7A may be implemented separately, or in combination with one another.

At block 701A, the encoder 20 applies a smoothing filter to a reference video unit or spatial neighboring video unit from a difference video layer. The difference video layer may refer to the difference domain. A reference video unit from the difference video layer may be used in performing inter prediction for a video unit. A spatial neighboring video unit from the difference video layer may be used in performing intra prediction for a video unit. Examples of smoothing filters can include, but are not limited to 3-tap filters, 4-tap filters, 6-tap filters, etc. In some embodiments, the encoder 20 applies a low-pass filter, such as a 1:2:1 filter. In other embodiments, the encoder 20 may apply a band-pass filter or a high-pass filter.

The encoder 20 may determine whether to apply a smoothing filter to a reference video unit or a spatial neighboring video unit based on the trade-off between the benefit of smoothing the video unit and the cost of added computational complexity from applying the smoothing filter. For example, the encoder 20 may decide to apply a smoothing filter if the texture of the video unit can be retained without adding much computational complexity.

At block 702A, the encoder 20 determines a value of a video unit based on the reference video unit or spatial neighboring video unit. A video unit may be any unit of video data, and can include but is not limited to: a frame, a slice, a largest coding unit (LCU), a coding unit (CU), a block, a pixel, and a sub-pixel. The value of the video unit may be determined by generating a prediction unit (PU) for the video unit.

In some embodiments, the encoder 20 may determine the value of the video unit using inter prediction based on the reference video unit, using intra prediction based on the spatial neighboring video unit, or both. In one embodiment, the reference video unit is derived from a difference of a reference video unit in the enhancement layer and a reference video unit in the base layer, and the reference video unit in the enhancement layer is weighted by an enhancement layer weight and the reference video unit in the base layer is weighted by a base layer weight. In another embodiment, the spatial neighboring video unit is derived from a difference of a spatial neighboring video unit in the enhancement layer and a spatial neighboring video unit in the base layer, and the spatial neighboring video unit in the enhancement layer is weighted by an enhancement layer weight and the spatial neighboring video unit in the base layer is weighted by a base layer weight.

In certain embodiments, the encoder 20 may define a prediction mode for applying the smoothing filter to the reference video unit or spatial neighboring video unit. The encoder 20 may select the prediction mode adaptively according to certain criteria, such as rate-distortion optimization criteria. In other embodiments, the encoder 20 may define a flag for applying the smoothing filter to the reference video unit or spatial neighboring video unit. Such flag may be signaled in a bitstream, or may be received in a bitstream or at least partially derived from information in a bitstream.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to code video information, the apparatus comprising:
a memory configured to store difference video information associated with a difference video layer of pixel information derived from a difference between an enhancement layer and a corresponding base layer; and
a processor in communication with the memory, the processor configured to:
signal or receive an indication that an enhancement layer video unit in the enhancement layer is to be coded in a smoothed difference domain prediction mode;
determine a first weighted sum of (i) a reference video unit in the enhancement layer and a reference video unit in the base layer, or (ii) a spatial neighboring video unit in the enhancement layer and a spatial neighboring video unit in the base layer;
apply a smoothing filter to the first weighted sum to generate a smoothed difference video unit;
determine a second weighted sum of the enhancement layer video unit and a base layer video unit in the base layer that corresponds to the enhancement layer video unit; and
predict the enhancement layer video unit in the smoothed difference domain prediction mode, using one of inter prediction or intra prediction, based on the smoothed difference video unit and the second weighted sum.

2. The apparatus of claim 1, wherein the smoothing filter is a low-pass filter.

3. The apparatus of claim 2, wherein the low-pass filter is a 1:2:1 filter.

4. The apparatus of claim 1, wherein the reference video unit in the enhancement layer is weighted by an enhancement layer weight and the reference video unit in the base layer is weighted by a base layer weight that is different from the enhancement layer weight.

5. The apparatus of claim 1, wherein the spatial neighboring video unit in the enhancement layer is weighted by an enhancement layer weight and the spatial neighboring video unit in the base layer is weighted by a base layer weight that is different from the enhancement layer weight.

6. The apparatus of claim 1, wherein the enhancement layer video unit is one of: a frame, a slice, a largest coding unit (LCU), a coding unit (CU), a block, a pixel, or a sub-pixel.

7. The apparatus of claim 1, wherein the indication comprises a flag signaled or received in one of a sequence header, a picture header, a slice header, an LCU header, or a CU level syntax.

8. The apparatus of claim 1, wherein the processor is further configured to adaptively determine whether the enhancement layer video unit in the enhancement layer is to be coded in the smoothed difference domain prediction mode according to rate-distortion optimization criteria.

9. The apparatus of claim 1, wherein the processor is further configured to signal or receive a flag indicating that the enhancement layer video unit in the enhancement layer is to be coded in the smoothed difference domain prediction mode.

10. The apparatus of claim 9, wherein the flag is signaled or received at a coding level selected from a group comprising: sequence, picture, slice, LCU, CU, and PU, and wherein the flag is signaled or received for signal components selected from a group comprising: luma components only, chroma components only, and any combination of luma and chroma components.

11. The apparatus of claim 1, wherein the processor is further configured to reconstruct the enhancement layer video unit based on the prediction of the enhancement layer video unit.

12. The apparatus of claim 1, wherein the base layer is a reconstructed base layer.

13. The apparatus of claim 1, wherein the processor is further configured to encode the enhancement layer video unit in a bitstream.

14. The apparatus of claim 1, wherein the processor is further configured to decode the enhancement layer video unit in a bitstream.

15. The apparatus of claim 1, wherein the apparatus is selected from a group consisting of: a desktop computer, a notebook computer, a laptop computer, a tablet computer, a set-top box, a telephone handset, a smart phone, a wireless communication device, a smart pad, a television, a camera, a display device, a digital media player, a video gaming console and a video streaming device.

16. A method of coding video information comprising:
storing difference video information associated with a difference video layer of pixel information derived from a difference between an enhancement layer and a corresponding base layer;
signaling or receiving an indication that an enhancement layer video unit in the enhancement layer is to be coded in a smoothed difference domain prediction mode;
determining a first weighted sum of (i) a reference video unit in the enhancement layer and a reference video unit in the base layer, or (ii) a spatial neighboring video unit in the enhancement layer and a spatial neighboring video unit in the base layer;
applying a smoothing filter to the first weighted sum to generate a smoothed difference video unit;
determining a second weighted sum of the enhancement layer video unit and a base layer video unit in the base layer that corresponds to the enhancement layer video unit; and
predicting the enhancement layer video unit in the smoothed difference domain prediction mode, using one of inter prediction or intra prediction, based on the smoothed difference video unit and the second weighted sum.

17. The method of claim 16, wherein the smoothing filter is a low-pass filter.

18. The method of claim 17, wherein the low-pass filter is a 1:2:1 filter.

19. The method of claim 16, wherein the reference video unit in the enhancement layer is weighted by an enhancement layer weight and the reference video unit in the base layer is weighted by a base layer weight that is different from the enhancement layer weight.

20. The method of claim 16, wherein the spatial neighboring video unit in the enhancement layer is weighted by an enhancement layer weight and the spatial neighboring video unit in the base layer is weighted by a base layer weight that is different from the enhancement layer weight.

21. The method of claim 16, wherein the enhancement layer video unit is one of: a frame, a slice, a largest coding unit (LCU), a coding unit (CU), a block, a pixel, or a sub-pixel.

22. The method of claim 16, wherein the indication comprises a flag signaled or received in one of a sequence header, a picture header, a slice header, an LCU header, or a CU level syntax.

23. The method of claim 16, further comprising adaptively determining whether the enhancement layer video unit in the enhancement layer is to be coded in the smoothed difference domain prediction mode according to rate-distortion optimization criteria.

24. The method of claim 16, further comprising signaling or receiving a flag indicating that the enhancement layer video unit in the enhancement layer is to be coded in the smoothed difference domain prediction mode.

25. The method of claim 24, wherein the flag is signaled or received at a coding level selected from a group comprising: sequence, picture, slice, LCU, CU, and PU, and wherein the flag is signaled or received for signal components selected from a group comprising: luma components only, chroma components only, and any combination of luma and chroma components.

26. The method of claim 16, further comprising reconstructing the enhancement layer video unit based on the prediction of the enhancement layer video unit.

27. The method of claim 16, wherein the base layer is a reconstructed base layer.

28. The method of claim 16, further comprising encoding the enhancement layer video unit in a bitstream.

29. The method of claim 16, further comprising decoding the enhancement layer video unit in a bitstream.

30. A non-transitory computer-readable storage medium having instructions stored thereon that when executed cause an apparatus to:
store difference video information associated with a difference video layer of pixel information derived from a difference between an enhancement layer and a corresponding base layer;
signal or receive an indication that an enhancement layer video unit in the enhancement layer is to be coded in a smoothed difference domain prediction mode;
determine a first weighted sum of (i) a reference video unit in the enhancement layer and a reference video unit in the base layer, or (ii) a spatial neighboring video unit in the enhancement layer and a spatial neighboring video unit in the base layer;
apply a smoothing filter to the first weighted sum to generate a smoothed difference video unit;
determine a second weighted sum of the enhancement layer video unit and a base layer video unit in the base layer that corresponds to the enhancement layer video unit; and predict the enhancement layer video unit in the smoothed difference domain prediction mode, using one of inter prediction or intra prediction, based on the smoothed difference video unit and the second weighted sum.

31. The computer-readable storage medium of claim 30, wherein (i) the reference video unit in the enhancement layer is weighted by an enhancement layer weight and the reference video unit in the base layer is weighted by a base layer weight that is different from the enhancement layer weight; or (ii) the spatial neighboring video unit in the enhancement layer is weighted by an enhancement layer weight and the spatial neighboring video unit in the base layer is weighted by a base layer weight that is different from the enhancement layer weight.

32. An apparatus configured to code video information, the apparatus comprising:
   means for storing difference video information associated with a difference video layer of pixel information derived from a difference between an enhancement layer and a corresponding base layer;
   means for signaling or receiving an indication that an enhancement layer video unit in the enhancement layer is to be coded in a smoothed difference domain prediction mode;
   means for determining a first weighted sum of (i) a reference video unit in the enhancement layer and a reference video unit in the base layer, or (ii) a spatial neighboring video unit in the enhancement layer and a spatial neighboring video unit in the base layer; means for applying a smoothing filter to the first weighted sum to generate a smoothed difference video unit;
   means for determining a second weighted sum of the enhancement layer video unit and a base layer video unit in the base layer that corresponds to the enhancement layer video unit; and
   means for predicting the enhancement layer video unit in the smoothed difference domain prediction mode, using one of inter prediction or intra prediction, based on the smoothed difference video unit and the second weighted sum.

33. The apparatus of claim 32, wherein the reference video unit in the enhancement layer is weighted by an enhancement layer weight and the reference video unit in the base layer is weighted by a base layer weight that is different from the enhancement layer weight.

34. The apparatus of claim 32, wherein the spatial neighboring video unit in the enhancement layer is weighted by an enhancement layer weight and the spatial neighboring video unit in the base layer is weighted by a base layer weight that is different from the enhancement layer weight.

35. The apparatus of claim 32, wherein the indication comprises a flag signaled or received in one of a sequence header, a picture header, a slice header, an LCU header, or a CU level syntax.

36. The apparatus of claim 32, further comprising means for adaptively determining whether the enhancement layer video unit in the enhancement layer is to be coded in the smoothed difference domain prediction mode according to rate-distortion optimization criteria.

37. The apparatus of claim 32, further comprising means for signaling or receiving a flag indicating that the enhancement layer video unit in the enhancement layer is to be coded in the smoothed difference domain prediction mode.

38. The apparatus of claim 1, wherein the apparatus is a wireless communication device, further comprising:
   a receiver configured to receive encoded video data, the encoded video data comprising the difference video information associated with the difference video layer.

39. The apparatus of claim 38, wherein the wireless communication device is a cellular telephone and the encoded video data is received by the receiver and modulated according to a cellular communication standard.

40. The method of claim 16, the method being executable on a wireless communication device, wherein the device comprises:
   a memory configured to store video data;
   a processor configured to execute instructions to process the video data stored in said memory;
   a receiver configured to receive encoded video data, the encoded video data comprising the difference video information associated with the difference video layer.

41. The method of claim 40, wherein the wireless communication device is a cellular telephone and the encoded video data is received by the receiver and modulated according to a cellular communication standard.

* * * * *